US010491652B2

(12) United States Patent
Murphey

(10) Patent No.: US 10,491,652 B2
(45) Date of Patent: Nov. 26, 2019

(54) PROVIDING A CONTENT ITEM FROM AN ONLINE SYSTEM TO A THIRD PARTY SYSTEM THAT MODIFIES THE CONTENT ITEM FOR PRESENTATION IN ACCORDANCE WITH A LAYOUT SPECIFIED BY THE THIRD PARTY SYSTEM

(71) Applicant: Facebook, Inc., Menlo Park, CA (US)

(72) Inventor: Charles Michael Murphey, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 304 days.

(21) Appl. No.: 15/340,179

(22) Filed: Nov. 1, 2016

(65) Prior Publication Data
US 2018/0121070 A1 May 3, 2018

(51) Int. Cl.
*G06F 17/30* (2006.01)
*H04L 29/08* (2006.01)
*G06F 17/22* (2006.01)

(52) U.S. Cl.
CPC .......... *H04L 67/02* (2013.01); *G06F 17/2247* (2013.01); *H04L 67/20* (2013.01)

(58) Field of Classification Search
CPC .......... G06F 17/2247; G06F 17/30905; G06Q 30/0277; G06Q 30/0241; G06Q 30/0244; G06Q 30/0251; H04L 67/02; H04L 67/20
See application file for complete search history.

(56) References Cited

U.S. PATENT DOCUMENTS

| | | | | |
|---|---|---|---|---|
| 6,654,725 B1 * | 11/2003 | Langheinrich | ......... | G06Q 30/02 705/14.52 |
| 8,121,893 B1 * | 2/2012 | Krikheli | ................. | G06Q 30/02 705/14.1 |
| 2004/0260767 A1 * | 12/2004 | Kedem | ................... | G06Q 30/02 709/203 |
| 2006/0293949 A1 * | 12/2006 | Grossnickle | ........... | G06Q 30/02 705/14.61 |
| 2008/0183573 A1 * | 7/2008 | Muschetto | ............. | G06Q 30/02 705/14.41 |
| 2011/0029393 A1 * | 2/2011 | Apprendi | ........... | G06Q 30/0277 705/14.73 |
| 2015/0206199 A1 * | 7/2015 | Zhang | ................ | G06Q 30/0241 705/14.73 |
| 2015/0220990 A1 * | 8/2015 | Kobyakov | ......... | G06Q 30/0241 705/14.6 |
| 2017/0116639 A1 * | 4/2017 | Tunguz-Zawislak | ........................ G06Q 30/0256 | |

* cited by examiner

*Primary Examiner* — Wilson W Tsui
(74) *Attorney, Agent, or Firm* — Fenwick & West LLP

(57) ABSTRACT

An online system provides content to a third party system and allows the third party system to customize the content for presentation in conjunction with other content provided by the third party system. The third party system includes instructions in content provided by the third party system that, when executed by a client device, obtains the content from the online system via a frame rendered within the content provided by the third party system. Using layout information included within the content provided by the third party system, the client device presents the content obtained from the online system in conjunction with the content provided by the third party system. Hence, the layout information allows the third party system to specify placement or formatting of the content obtained from the online system.

12 Claims, 3 Drawing Sheets

PROVIDING A CONTENT ITEM FROM AN ONLINE SYSTEM TO A THIRD PARTY SYSTEM THAT MODIFIES THE CONTENT ITEM FOR PRESENTATION IN ACCORDANCE WITH A LAYOUT SPECIFIED BY THE THIRD PARTY SYSTEM

BACKGROUND

This disclosure relates generally to presenting content to users of an online system, and more specifically to providing a content item from an online system to a third party system for presentation based on a layout specified by the third party system.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. An online system may also generate content for presentation to a user, such as content describing actions taken by other users on the online system.

Additionally, many online systems commonly allow publishing users (e.g., businesses) to sponsor presentation of content on an online system to gain public attention for a user's products or services or to persuade other users to take an action regarding the publishing user's products or services. Content for which the online system receives compensation in exchange for presenting to users is referred to as "sponsored content." Many online systems receive compensation from a publishing user for presenting online system users with certain types of sponsored content provided by the publishing user. Frequently, online systems charge a publishing user for each presentation of sponsored content to an online system user or for each interaction with sponsored content by an online system user. For example, an online system receives compensation from a publishing user each time a content item provided by the publishing user is displayed to another user on the online system or each time another user is presented with a content item on the online system and interacts with the content item (e.g., selects a link included in the content item), or each time another user performs another action after being presented with the content item.

Many online systems exchange information with third party systems that also provide content to users. For example, a third party system is an application provider that communicates content to client devices for presentation in an application executing on client devices and associated with the third party system, and the online system selects content for presentation to a user that is communicated to the third party system for presentation to users via the application. As many online systems select content for presentation to a user based on information associated with the user by the online system, online systems may provide content with which the user is more likely to interact or in which the user is more likely to have an interest to the third party system for presentation. This may increase the user's interaction with content provided by the third party system.

However, when providing content to a third party system for presentation by a third party system, conventional online systems provide discrete content items to the third party system, which presents one or more of the content items in conjunction with content provided by the third party system. Content items provided by a conventional online system to a third party system for presentation are typically formatted as if they were to be presented by the online system. As many third party systems present content tailored for presentation by application executing on client devices and associated with the third party system, a content item provided by an online system to the third party system often appears out of place when presented in conjunction with content generated and provided by the third party system. Differences in appearance between content provided by a third party system to users and content that the third party system received form the online system may detract from user engagement with the content provided by the third party system and also detract from user interaction with the content obtained by the third party system from the online system.

SUMMARY

To allow third party systems to leverage content maintained by an online system external to the third party system, the online system provides one or more components of a content item to a third party system. For example, the online system provides a content item including multiple components and information identifying one or more of the components. Content provided by the third party system to a client device for presentation includes one or more instructions that, when executed by a client device presenting the content, cause the client device to render a frame within the content including one or more components of the content item provided by the online system. In various embodiments, executing the instructions cause the client device to retrieve one or more components of the content item from the online system and include the one or more components of the content item in the frame. Executing the instructions also causes the client device to communicate information identifying the content provided by the third party system to the online system when obtaining the one or more components of the content item.

Additionally, the content provided by the third party system to the client device includes layout information describing formatting and positioning of different portions of the content during presentation. For example, the third party system communicates a markup language document including content provided by the third party system, the instructions for execution by the client device to obtain the one or more components of one or more content items from the online system, and layout information describing positions of various portions of content provided by the third party system within a web page. The layout information also specifies formatting and positioning of one or more components of one or more of the components of the content item obtained from the online system. Hence, the layout information allows the third party system to specify formatting of one or more components of the content item obtained from the online system and positioning of various components of the content item when the client device presents the content from the third party system and the one or more components of the content item obtained from the online system.

When the client device receiving the content from the third party system presents the content, the client device executes the instructions for obtaining one or more components of the content item from the online system and renders a frame within the content that includes the one or more components of the content item from the online system.

Based on layout information received from the third party system along with the content, the client device renders the content from the third party system and one or more of the components of the content item. Hence, the layout information specifies positioning of various portions of the content form the third party system as well as one or more components of the content item, from the online system. Additionally, the layout information may also specify dimensions, font size, font color, aspect ratio, or other formatting information specifying characteristics of how components of the content item obtained from the online system are presented. This allows the third party system to present content obtained from the online system to a user in a format that better integrates the content from the online system with content provided by the third party system. For example, a content item obtained from the online system is a content item for which the online system receives compensation in exchange for presenting or in exchange for users interacting with the content item. Obtaining one or more components of the content item in a frame included in content provided by the third party system and laying out at least a set of the one or more components according to layout information from the third party system increases a likelihood of a user interacting with one or more components of the content item when the content item is presented in conjunction with content provided by the third party system, increasing a likelihood of the online system receiving compensation from providing the one or more components of the content item to the third party system for presentation.

In some embodiments, the content item obtained from the online system includes a landing page specifying a network address of a page of content to which a user is directed when the content item is accessed. To reduce a likelihood of the content item obtained from the online system fraudulently being presented in conjunction with content from a third party system other than the third party system providing the content to the client device that included instructions for obtaining the content item or being presented in alternative content from the third party system other than the content including the instructions for obtaining the content item, the one or more components of the content item obtained by the client device when executing the instructions included in the content from the third party system do not include the landing page of the content item. Instead, the components of the content item include monitoring instructions that, when executed by the client device presenting the content from the third party system and one or more of the components of the content item, identify an interaction with a component of the content item received by the online system, communicate information describing the dignified interaction to the frame included in the content provided by the third party system. Via the frame, execution of the instructions transmits information identifying the content provided by the third party system and the identified interaction to the online system.

Based on the information identifying the content, the online system determines whether the content provided by the third party system identified along with the identified interaction matches the content provided by the third party system when the one or more components of the content item were obtained. If the content provided by the third party system identified along with the identified interaction matches the content provided by the third party system when the one or more components of the content item were obtained, the online system communicates a redirect including the landing page of the content item to the frame included in the content provided by the third party system and stores the information describing the identified interaction in association with the content item. However, if the content provided by the third party system identified along with the identified interaction does not match the content provided by the third party system when the one or more components of the content item were obtained, the online system does not communicate a redirect including the landing page of the content item to the frame included in the content provided by the third party system and does not stores the information describing the identified interaction in association with the content item. In some embodiments, the online system provides an error message to the frame included in the content provided by the third party system in response to the content provided by the third party system identified along with the identified interaction not matching the content provided by the third party system when the one or more components of the content item were obtained. Alternatively, the online system takes no action in response to the content provided by the third party system identified along with the identified interaction not matching the content provided by the third party system when the one or more components of the content item were obtained.

BRIEF DESCRIPTION OF THE DRAWINGS

FIG. 2 is a block diagram of an online system, in accordance with an embodiment of.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
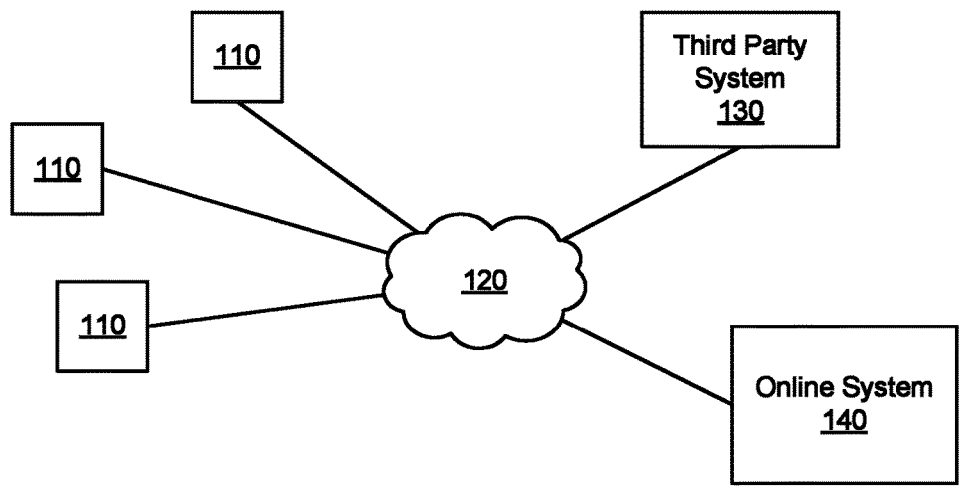
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 provide content to users of the online system 140. For example, a third party system 130 maintains pages of content that users of the online system 140 may access through one or more applications executing on a client device 110. The third party system 130 may provide content items to the online system 140 identifying content provided by the online system 130 to notify users of the online system 140 of the content provided by the third party system 130. For example, a content item provided by the third party system 130 to the online system 140 identifies a page of content provided by the online system 140 that specifies a network address for obtaining the page of content. If the online system 140 presents the content item to a user who subsequently accesses the content item via a client device 110, the client device 110 obtains the page of content from the network address specified in the content item. This allows the user to more easily access the page of content.

Similarly, the third party system 130 may include content items received from the online system 140 in content provided to users by the third party system 130. For example, the third party system 130 obtains one or more content items from the online system 140 and includes the one or more content items in a page of content that also includes content provided by the third party system 130. As another example, the third party system 130 obtains one or more content items from the online system 140 and includes a set of the content items in an application associated with the third party system 130 and executing on a client device 110 that presents content received from the third party system 130. This allows a third party system 130 to leverage additional content maintained by the online system 140 for presentation or to leverage one or more selection processes used by the online system 140 to obtain content items from the online system 140 with which a user is more likely to interact. Leveraging content or content selection from the online system 140 may increase user interaction with or satisfaction with content provided by the third party system 130.

To combine content items from the online system 140 with content provided by the third party system 130, when the third party system 130 provides content that includes one or more content items from the online system 140 to a client device 110, the third party system 130 includes instructions in the content that, when executed by the client device 110 generate a frame within the content. For example, the third party system 130 provides a markup language document describing a web page to the client device 110. The markup language document includes instructions that, when executed by the client device 110, cause the client device 110 to generate an iframe within the web page and obtain a content item, or components of a content item, from the online system 140 via the iframe. In various embodiments, the instructions identify a domain of the online system 140 and an identifier of one or more content items to retrieve from the online system 140. Additionally, the markup language document includes layout information describing formatting and positioning of different portions of the content during presentation. As further described below in conjunction with FIGS. 3 and 4, when the client device 110 generates the web page from the third party system 130, the client device 110 executes the instructions in the markup language document, which renders a frame in the web page and obtains the content item, or components of the content item, from the online system 140 for inclusion in the frame. The client device 110 generates the web page by formatting and positioning content from the third party system 130 in the markup language document and one or more components of the content item from the frame based on layout information included in the markup language document. Hence, the layout information allows the third party system 130 to specify how components of the content item obtained from the online system 140 are presented and positioned in conjunction with content provided by the third party system 130 to the client device 110.

Figure 2:
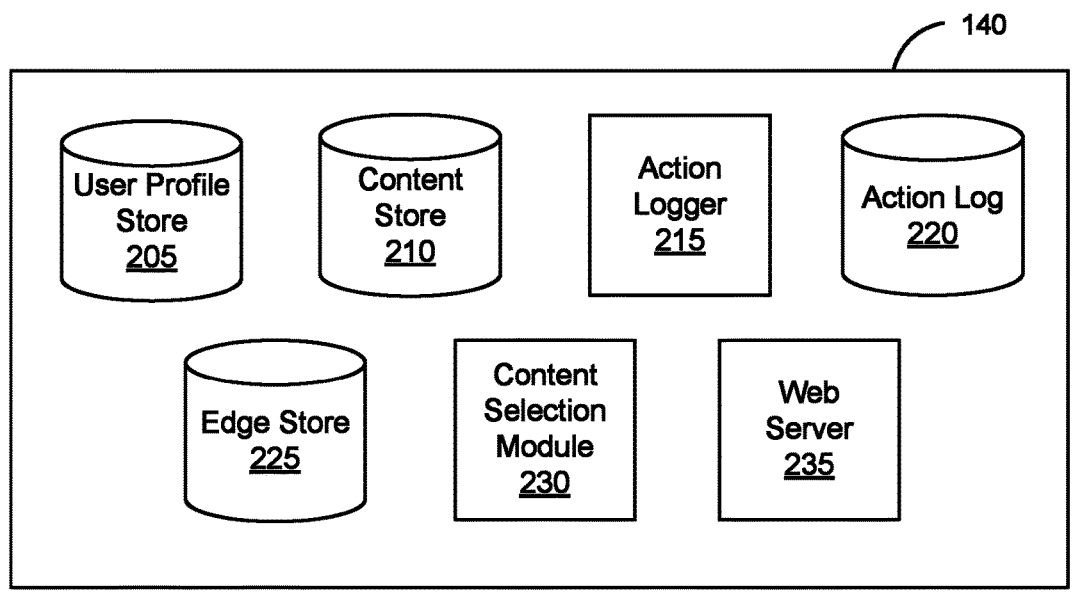

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store 210 for subsequent retrieval by the content selection module 230, which is further described below.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

In various embodiments, the content selection module 230 provides one or more content items selected for a user to a third party system 130, which presents one or more of the content items to the user. For example, a third party system 130 communicates a request for one or more content items to the online system 140 that includes information identifying a user to the online system 140. Based on information associated with the user, the content selection module 230 selects one or more content items for presentation to the user and communicates one or more of the selected content items to the third party system 130. Alternatively, the third party system 130 requests content from the online system 140, and the content selection module 230 selects one or more content items from the content store 210 using any suitable method and communicates one or more of the selected content items to the third party system 130. As further described below in conjunction with FIGS. 3 and 4, the third party system 130 may subsequently present a content item received from the content selection module 230 in conjunction with other content provided by the third party system 130, while formatting the content item from the content selection module 230 based on layout information specified by the third party system 130.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
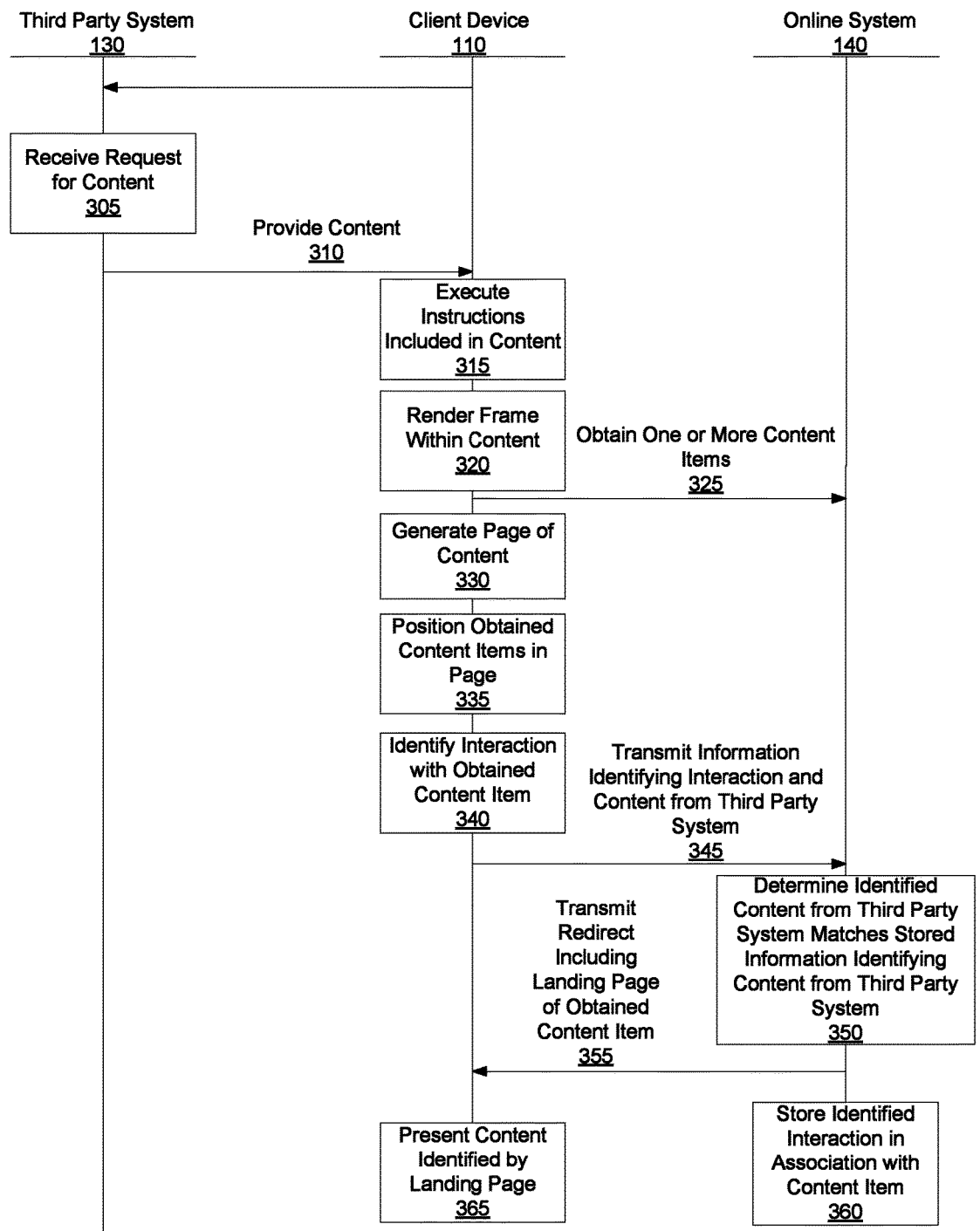
FIG. 3 is an interaction diagram of a method for providing content from an online system for presentation in conjunction with content provided by a third party system, in accordance with an embodiment.

Providing Content from an Online System to a Third Party System for Presentation with Content from the Third Party System FIG. 3 is an interaction diagram of a method for providing content from an online system 140 for presentation in conjunction with content provided by a third party system 130. In other embodiments, the method may include different and/or additional steps than those shown in FIG. 3. Additionally, steps of the method may be performed in different orders than the order described in conjunction with FIG. 3 in various embodiments.

A third party system 130 provides content to one or more client devices 110 for presentation to various users. For example, the third party system 130 provides an application to a client device 110 that, when executed by the client device 110, obtains content from the third party system 130 and presents the content to a user of the client device 110. As another example, the third party system 130 maintains markup language documents describing various web pages and provides a markup language document to a client device 110, which presents the web page by rendering content described by the markup language document. To augment content provided by the third party system 130, the third party system 130 obtains one or more content items from the online system 140 and presents one or more of the obtained content items in conjunction with content provided by the online system 140. This allows the third party system 130 to leverage content maintained or selected by the online system 140 to increase interaction with the content provided by the third party system 130.

However, content items obtained from the online system 140 may have different characteristics when presented than the content provided by the third party system 130. For example, the third party system 130 provides a web page, one or more content items obtained from the online system 140 may have a different display font, a different color, a different aspect ratio, or any other characteristic causing a content item obtained from the online system 140 to be presented differently than other portions of the web page when presented. As another example, the third party system 130 is associated with an application executing on a client device 110 that obtains and presents content from the third party system 130, and a content item obtained from the online system 140 by the third party system 130 has a different appearance than content from the third party system 130 when presented by the application. Differing appearances of content from the third party system 130 and content items obtained from the online system 140 may decrease a likelihood of users interacting with the content from the third party system 130 or with the content items obtained from the online system 140.

To leverage content maintained by the online system 140 in conjunction with content provided by the third party system 130, the third party system 130 receives 305 a request for content from a client device 110. The requested content includes content provided by the third party as well as content obtained from the online system 140. For example, the third party system 130 receives 305 a request for a web page including content provided by the third party system 130 and also including content obtained from the online system 140.

In some embodiments, the requested content includes information indicating that one or more content items are to be obtained from the online system 140 when the content is provided to the client device 110 or is presented by the client device 110. Information indicating content to be retrieved from the online system 140 may specify one or more parameters for obtaining one or more content items from the online system 140. For example, parameters included in content maintained by the third party system 130 includes identifiers of one or more content items maintained by the online system 140. As another example, content maintained by the third party system 130 includes parameters specifying one or more characteristics of content items to be obtained from the online system 140, so content items having at least a threshold amount of the characteristics are obtained from the online system 140.

Additionally, the content provided by the third party system 130 includes instructions that, when executed by the client device 110 that receives the content, causes the client device 110 to render a frame within the content, where the frame includes one or more components of a content item obtained from an online system 140. For example, the third party system 130 maintains a markup language document specifying a web page including content provided by the third party system 130 and instructions that, when executed by the client device 110, cause the client device 110 to generate an iframe within the web page and obtain a content item, or components of a content item, from the online system 140 via the iframe. In various embodiments, the instructions identify a domain of the online system 140 and an identifier of one or more content items to retrieve from the online system 140 or one or more parameters specifying characteristics of content items obtained from the online system 140. The content item may be obtained from the online system 140 based on one or more parameters included in the content provided by the third party system 140. For example, one or more parameters specify a topic of content items obtained from the online system 140 or an additional user associated with content items obtained from the online system 140.

The content provided by the third party system 140 includes layout information describing formatting or positioning of various portions of the content provided by the third party system 130 and the one or more content items obtained from the online system 140. For example, the third party system 130 maintains a markup language document including content provided by the third party system 130, the instructions for execution by the client device 110 to obtain the one or more content items from the online system 140, and layout information describing positions or display characteristics of various portions of content provided by the third party system 130 within a web page. The layout information also specifies formatting (also referred to as "display characteristics") or positioning of one or more components of one or more content items obtained from the online system 140 via the frame rendered by execution of the instructions included in the content provided by the third party system 130 (e.g., the markup language document maintained by the third party system 130). Hence, the layout information allows the third party system 130 to specify a format in which of one or more components of one or more content items obtained from the online system 140 is presented, as well as positioning of various components of one or more content items obtained from the online system 140 when the client device 110 presents the content from the third party system 140 and the one or more components of one or more content items obtained from the online system 140.

Hence, the instructions included in the content provided by the third party system 130 to a client device 110, when executed by the client device 110, cause the client device 110 to render a frame, such as iframe, within the content provided by the third party system 130, where the iframe obtains one or more content items (or components of one or more content items). Additionally, executing the instructions included in the content provided by the third party system 130 causes the client device 110 to generate the content provided by the third party system 130 based on layout information included in the content provided by the third party system 130 and to position an obtained content item (or one or more components of the obtained content item) within the content provided by the third party system 130. For example, the instructions are included in a markup language document describing presentation of content provided by the third party system 130, so when a client device 110 presents the web page, the client device 110 executes the instructions to present a content item obtained from the online system 140 or one or more components of the content item obtained from the online system 140 within the web page via an iframe rendered within the web page in the web page based on formatting information included in the markup language document.

The third party system 130 provides 310 the content, including the instructions for execution, to the client device 110 from which the request for content was received 305. After receiving the content, the client device 110 executes 315 the instructions included in the content item, causing the client device 110 to render 320 the frame within the content provided by the third party system 130, which obtains 325 one or more content items, or components of content items, from the online system 140 that are included in the generated frame. For example, a content item obtained 325 from the online system 140 has components including a title, image or video data, and a landing page specifying a network address of additional content for the client device to retrieve in response to an interaction with the content item; however, the content item may include any suitable components, such as those further described above in conjunction with FIG. 2. In various embodiments, the client device 110 obtains 325 the one or more content items, or components of one or more content items, by communicating a request to the online system 140 via the rendered frame, with the request including one or more parameters from the instructions included in the content provided 310 by the third party system and information identifying the content provided 310 by the third party system 130. Hence, executing 315 the instructions included in the content item causes the client device 110 to communicate with the online system 140 to obtain one or more content items (or components of one or more content items) via the rendered frame. As further described above, the instructions may include identifiers of one or more content items maintained by the online system 140 or one or more parameters specifying characteristics of one or more content items (or components of one or more content items) to obtain 325 from the online system 140. In various embodiments, a request including the one or more parameters or one or more identifiers is communicated from the client device 110 to the online system 140 via the rendered frame, and the online system 140 provides content items to the client device 110 via the rendered frame in response to the request. The obtained one or more content items (or components of one or more content items) are included in the rendered frames.

When presenting the content provided by the third party system 130, after obtaining 325 the one or more content items (or components of the one or more content items) from the online system 140, the client device 110 generates 330 a page of content including the content provided by the online system 140 and the obtained one or more content items or components of one or more content items. For example, based on a markup language document provided 310 to the client device 110 from the third party system 140, the client device 110 generates 330 a web page including content provided by the third party system 130. The content received from the third party system 130 includes layout information specifying positioning of various portions of the content form the third party system 130 as well as positioning of the one or more content items obtained 325 from the online system 140 or positioning of one or more components of content items obtained 325 from the online system 140. The layout information may also specify one or more display characteristics of the content provided by the third party system 130 as well as the one or more content items obtained 325 from the online system 140 (or one or more components of the content items obtained 325 from the online system 140). Example display characteristics of content include: dimensions, font size, font color, aspect ratio, background color, video or image resolution, or any other suitable characteristic describing presentation of content. When generating 330 the content from the third party system 130 and the one or more content items obtained 325 from the online system 140, the client device 110 positions 335 at least a set of the obtained content items (or at least a set of components of the obtained content items) based on the layout information and displays the set of content items or set of components of content items using display characteristics specified by the layout information.

Hence, the layout information allows the third party system 130 to present content items, or components of content items, obtained 325 from the online system 140 to a user in a format that better integrates the obtained one or more content items with content provided by the third party system 130. Using the layout information included in the content provided 310 by the third party system 130 to position 335 and present the one or more content items (or components of one or more content items) obtained 325 from the online system 140 allows a content item (or components of a content item) allows a content item (or components of a content item) obtained 325 from the online system 140 to be more cohesively integrated with the content provided 310 by the third party system 130. Having a more uniform presentation of content from the third party system 130 and content obtained 325 from the online system 140 increases user engagement an interaction with the content provided by the third party system 130 along with the content items (or components of content items) obtained from the online system 140. For example, the client device 110 obtains 325 a content item from the online system 140 for which the online system 140 receives compensation in exchange for presenting or in exchange for users interacting with the content item; presenting the obtained content item based on the layout information provided 310 by the third party system 130 increases a likelihood of a user interacting with the content item when presented by the third party system 130, which increases a likelihood of the online system 140 receiving compensation for presenting the content item.

In some embodiments, a content item obtained 325 from the online system 140 includes a landing page specifying a network address of a page of content to which a user is directed when the content item is accessed. For example, when a user accesses the content item, a network address is provided to the client device 110 presenting the content item, causing the client device 110 to obtain content identified by the network address from a source identified by the network address and present the content identified by the network address. When the content item including the landing page is presented by a third party system 130 in conjunction with content provided by the third party system 130, the online system 140 reduces a likelihood of the content item being fraudulently being presented in conjunction with alternative content from the third party system 130 or from being presented in conjunction with content provided by another third party system 130, when the client device 110 obtains 325 the content item from the online system 140, the online system 140 includes monitoring instructions in the content item rather than the landing page. Hence, the client device 110 obtains 325 the content item including the monitoring instructions in place of the landing page from the online system 140. When the client device 110 executes the monitoring instructions included in the obtained content item, the client device 110 identifies 340 an interaction with the content item when the content item is presented (or identifies 340 an interaction with a component of the content item that is presented by the client device 110) and transmits 345 information describing the identified interaction to the rendered frame included in the content provided 310 by the third party system 130. The frame transmits 345 information identifying the content provided by the third party system 130 presented by the client device 110 and a description of the identified interaction to the online system 140.

Based on the information identifying the content provided by the third party system 130 and presented by the client device 110, the online system 140 determines 350 whether the identified content provided by the third party system 130 matches information identifying the content provided by the third party system 130 included in a request for the one or more content items or components of one or more content items the online system 140 received from the client device 110. In response to the information identifying the content provided by the third party system 130 received from the client device 110 executing the monitoring instructions matches information identifying the content provided 310 by the third party system 130 previously received by the online system 140 from the client device 110 via the rendered frame, the online system 140 transmits 355 a redirect including the landing page of the content item to the rendered frame included in the content provided 310 by the third party system 130 to the client device 110 and stores 360 information describing the identified interaction in association with the content item. The client device 110 subsequently presents 365 the content identified by the received landing page.

However, if the information identifying the content provided by the third party system 130 received from the client device 110 executing the monitoring instructions does not match information identifying the content provided 310 by the third party system 130 previously received by the online system 140 from the client device 110 via the rendered frame, the online system 140 does not communicate the redirect including the landing page of the content item to the frame included in the content provided by the third party system 130. Additionally, the online system 140 does not store 360 information describing the identified interaction in association with the content item if the information identifying the content provided by the third party system 130 received from the client device 110 executing the monitoring instructions does not match information identifying the content provided 310 by the third party system 130 previously received by the online system 140 from the client device 110 via the rendered frame. In some embodiments, the online system 140 provides an error message to the frame included in the content provided by the third party system 130 in response to the information identifying the content provided by the third party system 130 received from the client device 110 executing the monitoring instructions not matching information identifying the content provided 310 by the third party system 130 previously received by the online system 140 from the client device 110 via the rendered frame. The client device 110 subsequently presents the error message. Alternatively, the online system 140 takes no action in response to the information identifying the content provided by the third party system 130 received from the client device 110 executing the monitoring instructions not matching information identifying the content provided 310 by the third party system 130 previously received by the online system 140 from the client device 110 via the rendered frame.

Figure 4:
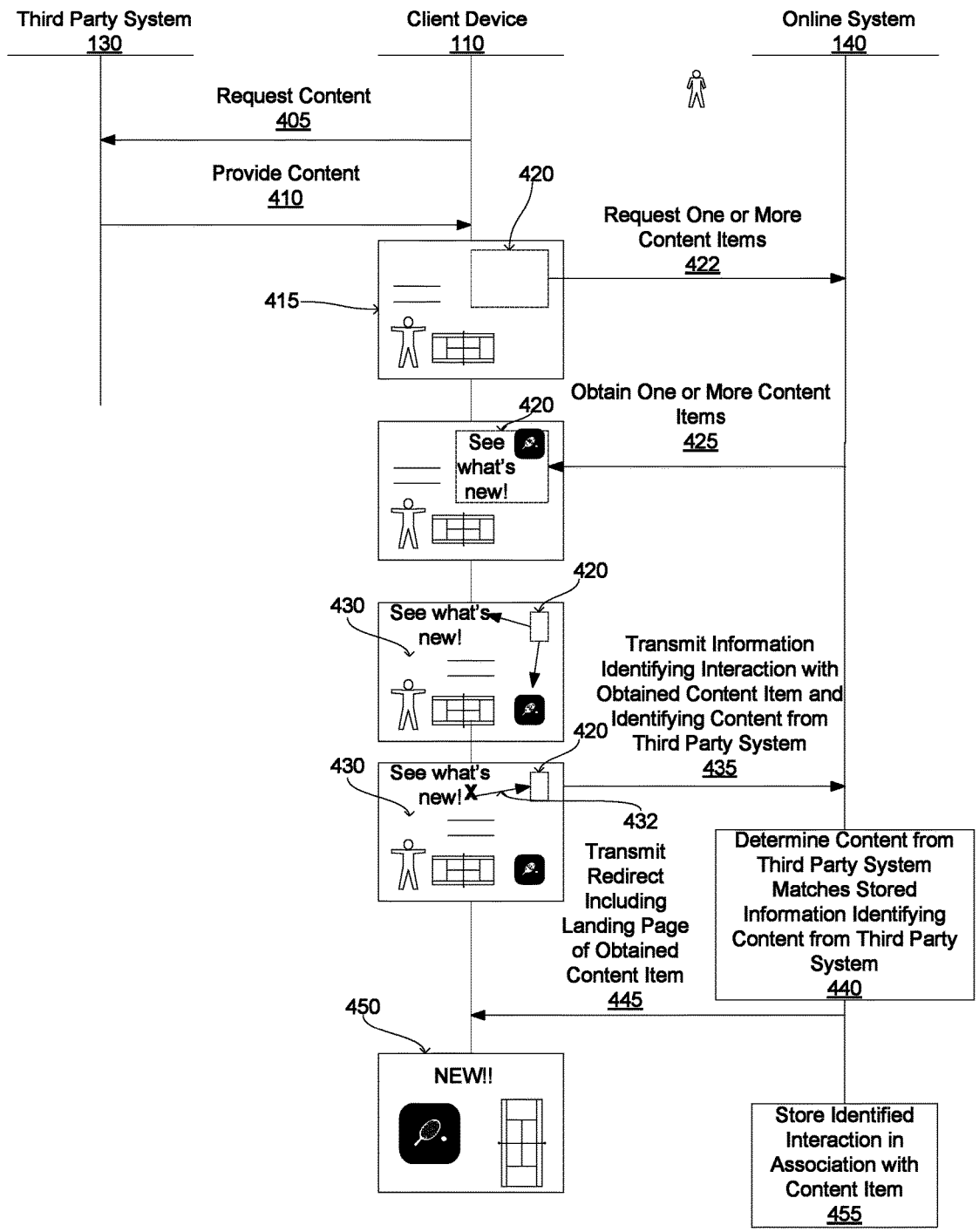
FIG. 4 is a conceptual diagram of providing content from an online system in conjunction with content provided by a third party system, in accordance with an embodiment.

FIG. 4 is a conceptual diagram of providing content from an online system 140 in conjunction with content provided by a third party system 130. In the example of FIG. 4, a client device 110 requests 405 content from a third party system 130, which provides 410 the content to the client device 110. For example, the client device 110 requests a web page from the third party system 130, which provides 410 a markup language document including content for the web page to the client device 110. As further described above in conjunction with FIGS. 1 and 3, the content provided 410 by the third party system 130 includes instructions that, when executed by the client device 110, obtain one or more content items from the online system 140. In the example of FIG. 4, when the online system 140 receives the content 415 from the third party system 130, the client device 110 executes the instructions included in the content 415 and renders a frame 420 within the content 415 from the third party system 130. In various embodiments, the rendered frame 420 is an iframe associated with a domain of the online system 140, which differs from a domain of the third party system 130.

Via the frame, the client device 110 requests 422 one or more content items from the online system 140 and obtains 425 one or more content items from the online system 140. As further described above in conjunction with FIG. 3, the instructions include one or more parameters specifying characteristics of one or more content items to obtain from the online system 140. For example, a parameter is an identifier of a specific content item used by the online system 140. As another example, various parameters identify characteristics of content items, and the online system 140 retrieves and communicates stored content items having the characteristics identified by the parameters to the client device 110. Content items obtained 425 from the online system 140 are stored in the frame 420 rendered within the content 415 from the third party system 130.

As further described above in conjunction with FIG. 3, the content 415 from the third party system 130 includes layout information describing positioning of content items obtained 425 from the online system 140 relative to content 415 from the third party system 130. The layout information may also describe display characteristics of content items obtained 425 from the online system 140, allowing the third party system 130 to specify how and where content items obtained 425 from the online system 140 are presented. Based on the layout information and the content provided 410 by the third party system 130, the client device 110 presents a page 430 of content including content 415 from the online system 140 and one or more content items obtained 425 from the online system 140. A content item obtained 425 from the online system 140 or components of a content item obtained 425 from the online system 140 is positioned within the page 430 of content based on the layout information and presented according to display characteristics specified in the layout information. Hence, the layout information allows the third party system 130 to specify how a content item obtained 425 from the online system 140 is presented, better integrating the obtained content item with the content 415 from the third party system 130.

In some embodiments, a content item obtained 425 from the online system 140 includes a landing page specifying a network address of a page of content to which a user is directed when the content item is accessed. As further described above in conjunction with FIG. 3, when the client device 110 obtains 425 the content item including the landing page from the online system 140, the online system 140 includes monitoring instructions in the content item rather than the landing page. Hence, the client device 110 obtains 425 the content item including the monitoring instructions in place of the landing page from the online system 140. When the client device 110 executes the monitoring instructions included in the obtained content item, the client device 110 identifies an interaction with the content item when the content item is presented and transmits 432 information describing the identified interaction to the frame 420 included in the content 415 from the third party system 130. The frame 420 transmits 435 information identifying the content 415 from the third party system 130 presented by the client device 110 along with the content item and a description of the identified interaction to the online system 140.

Based on the information identifying the content 415 from the third party system 130 and presented by the client device 110, the online system 140 determines 440 whether the identified content 415 from the third party system 130 matches information identifying the content from 415 the third party system 130 identified when the frame 420 requested 425 the one or more content items. In response to determining 440 the information identifying the content 415 from the third party system 130 from the client device 110 executing the monitoring instructions matches information identifying the content 415 from the third party system 130 previously received by the online system 140 from the client device 110 via the frame 420, the online system 140 transmits 445 a redirect including the landing page of the content item to the frame 420 included in the content 415 from the third party system 130 and stores 455 information describing the identified interaction in association with the content item. The client device 110 subsequently presents the content identified by the received landing page 450.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
  receiving, at a third party system, a request from a client device for a web page, the web page including content provided by the third system;
  retrieving a markup language document for the web page, the markup language document including instructions that, when executed by the client device, cause the client device to:
    render a frame within the web page, the frame including a content item obtained from and provided by an online system, the content item having one or more components for presentation, the one or more components including a title, image or video data, and monitoring instructions obtained from the online system;
    generate the web page based on layout information specified by the third party system and included in the markup language document, the layout information in the markup language document specifying one or more display characteristics corresponding to the one or more of the components of the content item obtained from the online system;
    format the one or more components of the content item within the frame subject to the one or more display characteristics, each component of the one or more components of the content item displayed by applying the one or more display characteristics in the layout information specified by the third party system corresponding to the component; and position the one or more components of the content item obtained from the online system at locations within the web page by applying the layout information included in the markup language document;

providing the markup language document to the client device, which is configured to execute the instructions included in the markup language document to display the web page and the frame within the web page, the frame displaying the one or more components of the content item formatted subject to the one or more display characteristics corresponding to the one or more components and positioned by the layout information specified by the third party system; and wherein the monitoring instructions, when executed by the client device, cause the client device to:
identify an interaction with a component of the content item positioned at a location within the web page specified by the layout information;
transmit information by the frame describing the identified interaction with the component of the content item to the online system in association with information identifying the content provided by the third party system included in the web page;
receive a redirect to the frame from the online system, the frame including a landing page specifying a network address identifying additional content for the client device to retrieve in response to an interaction with the content item, in response to the online system determining the information identifying the content provided by the third party system included in the web page matches identifying information of the content previously stored by the online system which associates the content provided by the third party system included in the web page with the content item; and
retrieve and present the additional content identified by the network address specified in the landing page included in the frame.

2. The method of claim 1, wherein the instructions, when executed by the client device, further cause the client device to:
display the content provided by the third party system at one or more locations within the web page using the one or more display characteristics specified by the layout information.

3. The method of claim 1, wherein a display characteristic is selected from a group consisting of: dimensions, font size, font color, aspect ratio, background color, video or image resolution, and any combination thereof.

4. The method of claim 1, wherein generate the web page based on layout information included in the markup language document comprises:
generate the web page including the content provided by the third party system in one or more locations and including the one or more components of the content item obtained from the online system in conjunction with the content provided by the third party system.

5. The method of claim 1, wherein the web page includes the content provided by the third party system displayed in conjunction with the one or more components of the content item obtained from the online system in the frame.

6. The method of claim 1, wherein the instructions include one or more parameters identifying the content item.

7. The method of claim 6, wherein the one or more parameters specify one or more characteristics of the content item.

8. The method of claim 6, wherein the one or more parameters include an identifier of the content item.

9. The method of claim 1, wherein render the frame within the web page, the frame including the one or more components of the content item obtained from the online system comprises:
obtain the content item from the online system based on the one or more parameters.

10. A computer program product comprising a non-transitory computer readable storage medium having instructions encoded thereon that, when executed by a processor, cause the processor to:
render a frame within a web page that includes content from a third party system, the frame including a content item obtained from and provided by an online system, the content item having one or more components for presentation, the one or more components including a title, image or video data, and monitoring instructions obtained from the online system;
position the content from the third party system within the web page by applying layout information included on the non-transitory computer readable storage medium by the third party system, the layout information also specifying one or more display characteristics corresponding to the one or more of the components of the content item obtained from the online system;
format the one or more components of the content item within the frame by applying the one or more display characteristics specified by the layout information, each component of the one or more components of the content item displayed by applying the one or more display characteristics in the layout information specified by the third party system corresponding to the component; and
position the one or more components of the content item obtained from the online system within the web page by applying the layout information included on the non-transitory computer readable storage medium by the third party system;
render the web page including the content from the third-party system and including the one or more components of the content item obtained from the online system within the frame, the frame displaying the one or more components of the content item formatted subject to the one or more display characteristics corresponding to the one or more components and positioned by the layout information specified by the third party system;
display the rendered web page on a client device including the processor; and
wherein the monitoring instructions, when executed by the client device, cause the client device to:
identify an interaction with a component of the content item positioned at a location within the web page specified by the layout information;
transmit information by the frame describing the identified interaction with the component of the content item to the online system in association with information identifying the content provided by the third party system included in the web page;
receive a redirect to the frame from the online system, the frame including a landing page specifying a network address identifying additional content for the client device to retrieve in response to an interaction with the content item, in response to the online system determining the information identifying the content provided by the third party system included in the web page matches identifying information of the content previously stored by the online system which associates the content provided by the third party system included in the web page with the content item; and retrieve and present the additional content identified by network address specified in the landing page included in the frame.

11. The method of claim 10, wherein the instructions, when executed by the client device, further cause the processor to:

display the content provided by the third party system at one or more locations within the web page using the one or more display characteristics specified by the layout information.

12. The computer program product of claim 10, wherein the web page includes the content provided by the third party system displayed in conjunction with the one or more components of the content item obtained from the online system in the frame.

* * * * *

UNITED STATES PATENT AND TRADEMARK OFFICE
CERTIFICATE OF CORRECTION

PATENT NO. : 10,491,652 B2
APPLICATION NO. : 15/340179
DATED : November 26, 2019
INVENTOR(S) : Charles Michael Murphey et al.

It is certified that error appears in the above-identified patent and that said Letters Patent is hereby corrected as shown below:

In the Claims

Column 20, Line 42, Claim 1, delete "the web page including content provided by the third system;" and insert -- the web page including content provided by the third party system; --

Signed and Sealed this
Second Day of June, 2020

Andrei Iancu
*Director of the United States Patent and Trademark Office*